US012387596B1

(12) United States Patent
Kim et al.

(10) Patent No.: US 12,387,596 B1
(45) Date of Patent: Aug. 12, 2025

(54) METHOD AND SYSTEM FOR SMART EVACUATION GUIDANCE IN ROAD TUNNEL

(71) Applicant: CORNERS CO., LTD., Seoul (KR)

(72) Inventors: Dong Oh Kim, Seoul (KR); Jang Won Choi, Seoul (KR)

(73) Assignee: CORNERS, CO., LTD., Seoul (KR)

( * ) Notice: Subject to any disclaimer, the term of this patent is extended or adjusted under 35 U.S.C. 154(b) by 0 days.

(21) Appl. No.: 18/818,281

(22) Filed: Aug. 28, 2024

(51) Int. Cl.
*G08G 1/09* (2006.01)

(52) U.S. Cl.
CPC .................................... *G08G 1/091* (2013.01)

(58) Field of Classification Search
CPC ....... G08G 1/091; G08B 3/1008; G08B 7/066
See application file for complete search history.

(56) References Cited

U.S. PATENT DOCUMENTS

2009/0066522 A1* 3/2009 Lee ........................ G08B 7/066 340/577
2016/0247369 A1* 8/2016 Simmons ............... G08B 7/062
2023/0260379 A1* 8/2023 Zaikonnikov .......... H04R 27/00 340/384.72

FOREIGN PATENT DOCUMENTS

KR 10-2260248 6/2021
KR 10-2021-0143108 A 11/2021
KR 10-2022-0140668 A 10/2022

OTHER PUBLICATIONS

Request for the Submission of an Opinion, mailed Aug. 22, 2024, issued in corresponding Korean Application No. 10-2024-0074000, filed Jun. 5, 2024, 18 pages.
Written Decision on Registration, mailed Feb. 25, 2025, issued in corresponding Korean Application No. 10-2024-0074000, filed Jun. 5, 2024, 7 pages.

* cited by examiner

*Primary Examiner* — Joseph H Feild
*Assistant Examiner* — Sharmin Akhter
(74) *Attorney, Agent, or Firm* — Christensen O'Connor Johnson Kindness PLLC

(57) ABSTRACT

A method and system for smart evacuation guidance in a road tunnel are disclosed. In an embodiment, a guidance device installed within a road tunnel includes: a power supply part; a first safety device activated by power from the power supply part, for guiding evacuation from the road tunnel in a first direction; a second safety device activated by power from the power supply part, for guiding evacuation in a second direction opposite to the first direction; a controller; and a control part that controls the first safety device and the second safety device, individually, in accordance with a control signal transmitted from the controller, wherein the controller includes a communication part that communicates with a repeater disposed in the road tunnel and receives the control signal from an evacuation guidance system of a disaster control center for the road tunnel and transmits the same to the control part.

10 Claims, 8 Drawing Sheets

METHOD AND SYSTEM FOR SMART EVACUATION GUIDANCE IN ROAD TUNNEL

CROSS-REFERENCE TO RELATED APPLICATION

This application is based on and claims priority under 35 U.S.C. 119 to Korean Patent Application No. 10-2024-0074000, filed on Jun. 5, 2024 in the Korean intellectual property office, the disclosures of which are herein incorporated by reference in their entireties.

TECHNICAL FIELD

The present disclosure relates to a method and system for smart evacuation guidance in a road tunnel.

BACKGROUND OF THE DISCLOSURE

Large and long tunnels carry the risk of mass casualties in disasters because they are a confined space, which necessitates a proper evacuation guidance system for efficient evacuation in case of a complex disaster. In a situation where a vehicle cannot escape from a road tunnel in the event of an emergency in the tunnel, such as fire, it is essential for the evacuee to evacuate to the outside after moving to a safe place of refugee such as a cross passage or a shelter via a cross-connecting path.

Guidance lighting is a light for guiding evacuation in the event of an emergency, which refers to a light that is lit by commercial power under normal circumstances and is automatically lit by emergency power in the event of a commercial power failure. Current evacuation guidance lighting installed in road tunnels is required to guide the evacuee toward an exit in the event of an emergency such as fire.

PRIOR ART DOCUMENT

Korean Patent Registration No. 10-2260248

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure provides a method and system for smart evacuation guidance in a road tunnel.

An embodiment of the present disclosure provides a controller included in a guidance device installed within a road tunnel, the guidance device including: a power supply part; a first safety device activated by power from the power supply part, for guiding evacuation from the road tunnel in a first direction; a second safety device activated by power from the power supply part, for guiding evacuation in a second direction opposite to the first direction; and a control part that controls the first safety device and the second safety device, individually, in accordance with a control signal transmitted from the controller, wherein the controller includes a communication part that communicates with a repeater disposed in the road tunnel and receives the control signal from an evacuation guidance system of a disaster control center for the road tunnel and transmits the same to the control part.

According to one aspect, the control signal may contain information for controlling the first safety device and the second safety device, individually, in the event of an emergency in the road tunnel, depending on whether the direction of evacuation from the road tunnel determined by the evacuation guidance system is either the first direction or the second direction.

According to another aspect, the control part may collect state information for each component of the guidance device, and the controller may further include an analysis part that receives the collected state information from the control part and analyzes the same.

According to another aspect, the analysis part may analyze whether the guidance device has a failure, based on the collected state information, and, in the event of a failure, may send information on the failure to the repeater through the communication part, in order to convey the information on the failure to the evacuation guidance system.

According to yet another aspect, the analysis part may predict at least one of the lifetime and performance of the guidance device based on the collected state information, and may send a maintenance alert to the repeater through the communication part, in order to convey the maintenance alert to the evacuation guidance system based on the predicted lifetime or performance.

According to a further aspect, the guidance device may further include a detection sensor for detecting information on at least one of surrounding temperature, flames, and smoke in the road tunnel, and the communication part may receive the detected information from the detection sensor and sends the same to the repeater, in order to convey the information detected by the detection sensor to the evacuation guidance system.

According to a further aspect, the power supply part may include: a first battery for supplying power to the first safety device; and a second battery for supplying power to the second safety device.

Another embodiment of the present disclosure provides a guidance device installed in a road tunnel, including: a power supply part; a first safety device activated by power from the power supply part, for guiding evacuation from the road tunnel in a first direction; a second safety device activated by power from the power supply part, for guiding evacuation in a second direction opposite to the first direction; a control part that controls the first safety device and the second safety device, individually, in accordance with a control signal received from an evacuation guidance system of a disaster control enter for the road tunnel; and a communication part that communicates with a repeater disposed in the road tunnel and receives the control signal from the evacuation guidance system and transmits the same to the control part.

Yet another embodiment of the present disclosure provides an evacuation guidance system implemented in a disaster control center for a road tunnel, the evacuation guidance system including: a receiving part that receives information on a jet fan disposed in the road tunnel from a jet fan remote control server which is included in the disaster control center, in order to remotely control the jet fan; a control part that determines the direction of evacuation for each of the plurality of guidance devices disposed in the road tunnel, based on the information on the jet fan, and creates a control signal for controlling the first safety device and the second safety device, individually, which are respectively included in the plurality of guidance devices disposed in the road tunnel, according to the determined direction of evacuation; and a transmitting part that sends the created control signal to a repeater disposed in the road tunnel, in order to convey the created control signal to each of the plurality of guidance devices, wherein the first safety device guides evacuation from the road tunnel in a first direction, and the second safety device guides evacuation in a second direction opposite to the first direction.

The present disclosure may provide a method and system for smart evacuation guidance in a road tunnel.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, an embodiment will be described in detail with reference to the accompanying drawings.

Figure 1:
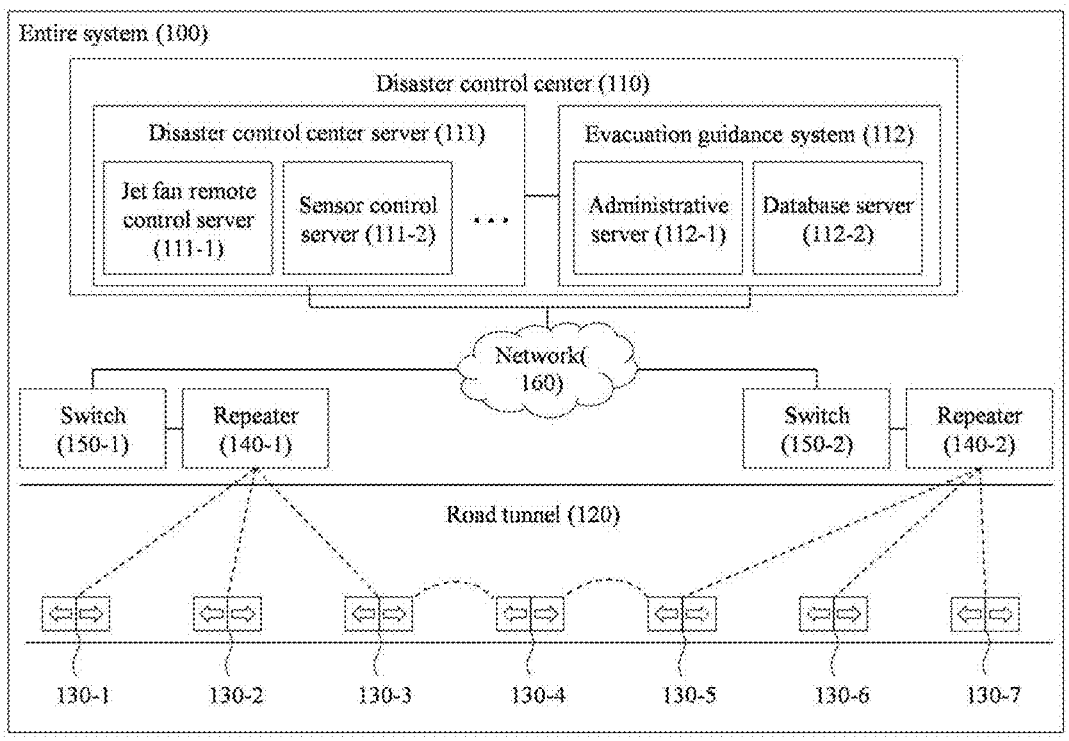
FIG. 1 is a view illustrating an example of a structure of an entire system for smart evacuation guidance in a road tunnel, according to an embodiment of the present disclosure.

FIG. 1 is a view illustrating an example of a structure of an entire system for smart evacuation guidance in a road tunnel, according to an embodiment of the present disclosure. The entire system 100 for smart evacuation guidance in the road tunnel may include a disaster control center 110, a road tunnel 120, a plurality of guidance devices 130-1 to 130-7, a plurality of repeaters 140-1 and 140-2, a plurality of switches 150-1 and 150-2, and a network 160.

The disaster control center 110 may serve as a central management center for managing the road tunnel 120. To this end, the disaster control center 110 may include a disaster control center server 111 for controlling and/or managing a jet fan, a sensor, etc. which are basically installed in the road tunnel 120. The disaster control center server 111 may include servers that are already well known in relation to the management of the road tunnel 120, including a jet fan remote control server 111-1 and a sensor control server 111-2, for example. Additionally, the disaster control center 110 may further include an evacuation guidance system 112 according to an embodiment of the present disclosure. The evacuation guidance system 112 may remotely control the plurality of guidance devices 130-1 to 130-7 installed in the road tunnel 120 that will be described hereinbelow.

The plurality of guidance devices 130-1 to 130-7 may be disposed at first preset intervals in the road tunnel 120. Thus, the number of guidance devices disposed in the road tunnel 120 may vary depending on the length of the road tunnel 120. The plurality of repeaters 140-1 and 140-2 and the plurality of switches 150-1 and 150-2 also may be installed at second preset intervals in the road tunnel 120, and therefore the number of repeaters disposed in the road tunnel 120 and the number of switches disposed in the road tunnel 120 also may vary depending on the length of the road tunnel 120.

In the event of an emergency such as fire, the evacuation guidance system 112 may create an evacuation route within the road tunnel 120 based on information transmitted from the disaster control center 111. The information transmitted from the disaster control center 111 may include, for example, jet fan information including jet fan operation information and jet fan scenario information and/or detected information from existing detection sensors installed in the road tunnel 120. Such information may be extensively used as data related to the operation of a smoke control equipment that is built in relation to the road tunnel 120 and the disaster control center 111. Also, the evacuation route created by the evacuation guidance system 112 may basically include information on the direction of evacuation the plurality of guidance devices 130-1 to 130-7 each need to guide. Afterwards, the evacuation guidance system 112 may transmit to the plurality of guidance devices 130-1 to 130-7 a control signal containing information on their corresponding direction of evacuation via the plurality of switches 150-1 and 150-2 and the plurality of repeaters 140-1 and 140-2. Therefore, the evacuation guidance system 112 is able to guide evacuation in the right direction by using information such as the location of an emergency such as a fire in its early stage and the direction of smoke control.

The plurality of guidance devices 130-1 to 130-7 each may include components for selectively guiding the evacuee to evacuate the road tunnel 120 in either a first direction or a second direction which is the opposite direction of the first direction. In this case, the plurality of guidance devices 130-1 to 130-7 may guide the evacuee to evacuate in the right direction according to information on the direction of evacuation obtained through a control signal transmitted from the evacuation guidance system 112. Guidance of evacuation may basically involve visually and continuously showing the direction, and in some embodiments, may additionally involve presenting repetitive visual information or repetitive or continuous audio information.

The direction the evacuee has to follow to evacuate the road tunnel 120 needs to be varied in accordance with various types of locations, such as the location of the evacuee and the location of an emergency such as fire. The plurality of guidance devices 130-1 to 130-7 may present information on the right direction of evacuation, thereby enabling the evacuee to quickly evacuate in a safe direction.

The plurality of guidance devices 130-1 to 130-7 and the plurality of repeaters 140-1 and 140-2 may basically communicate with one another via wireless communication. For example, the plurality of guidance devices 130-1 to 130-7 and the plurality of repeaters 140-1 and 140-2 may communicate with one another by using LoRa (Long Range) which is a LPWA (low-power, wide-area) wireless communication networking technique dedicated to Internet-of-things, which has benefits like low cost and high efficiency compared to wired communication. LoRa is an RF communication technique which uses allowable frequency bands of 900 MHz, which may provide high transmission performance and transmissivity with ultra-low power of 10 mW, from several hundreds of meters or longer in the center of a city to several thousands of meters or longer in the outdoors. Actual test results of LoRa in South Korea showed a transmission distance of about 340 m in the center of a city consisting of complicated building structures, and the transmission distance can be greatly increased by setting up a repeater function in LoRa communication software. For example, at least one (the guidance device 130-4 in the embodiment of FIG. 1) of the plurality of guidance devices 130-1 to 130-7 may communicate with their corresponding repeater via LoRa relay communication with a neighboring guidance device (the guidance device 130-3 or 130-5 in the embodiment of FIG. 1).

Although the foregoing description has been made with respect to wireless communication as an example of communication between the plurality of guidance devices 130-1 to 130-7 and the plurality of repeaters 140-1 and 140-2, it does not mean that wired communication will be excluded. Rather, the plurality of guidance devices 130-1 to 130-7 and the plurality of repeaters 140-1 and 140-2 each may further include a wireless communication module, in addition to a wired communication module.

The plurality of repeaters 140-1 and 140-2 may communicate with the disaster control center server 111 and the evacuation guidance system 112 over the network 160 via the plurality of switches 150-1 and 150-2. The network 160 may include one or more of such networks as PAN (personal area network), LAN (local area network), CAN (campus area network), MAN (metropolitan area network), WAN (wide area network), BBN (broadband network), and the internet, for example. Also, the network 160 may include, but not limited to, one or more of network topologies, including a bus network, a star network, a ring network, a mesh network, a star-bus network, a tree or hierarchical network, etc. In the embodiment of FIG. 1, it is assumed that the plurality of switches 150-1 and 150-2 and the network 160 are connected via optical communication, and that the network 160 uses TCP-IP (Transmission Control Protocol/Internet Protocol).

Figure 2:
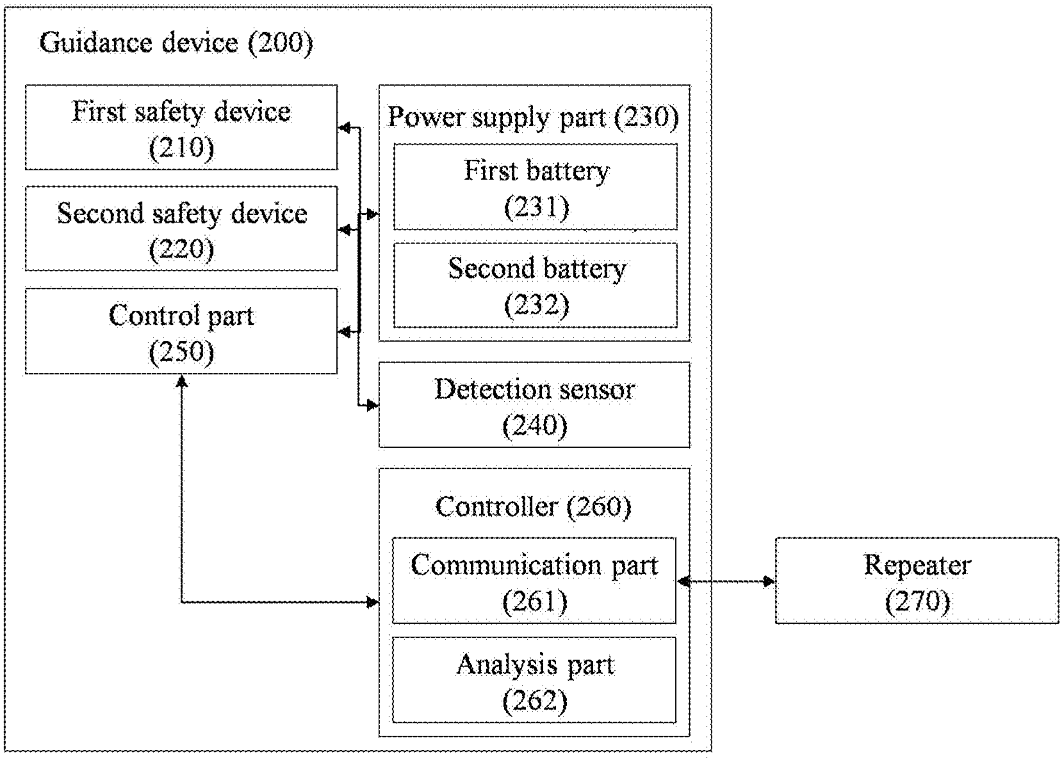
FIG. 2 is a view illustrating an example of an internal configuration of a guidance device, according to an embodiment of the present disclosure.

FIG. 2 is a view illustrating an example of an internal configuration of a guidance device, according to an embodiment of the present disclosure. The guidance device 200 according to the embodiment of FIG. 2 may correspond to one of the plurality of guidance devices 130-1 to 130-7 described previously with reference to FIG. 1, and may include a first safety device 210, a second safety device 220, a power supply part 230, a detection sensor 240, and a control part 250, and may further include a separate controller 260. The first safety device 210, the second safety device 220, the power supply part 230, the detection sensor 240, and the control part 250 may be components for actuating the guidance device 200. The controller 260 may be a component that is included in the guidance device 200 so as to allow the guidance device 200 to interoperate via the repeater 270 with the disaster control center server 111 and the evacuation guidance system 112 which have been described with reference to FIG. 1.

The first safety device 210 may be a component that is activated by power from the power supply part 230 to guide evacuation from the road tunnel 120 in a first direction, and the second safety device 220 may be a component that is activated by power from the power supply part 230 to guide evacuation from the road tunnel 120 in a second direction opposite to the first direction. In this case, in some embodiments, the power supply part 230 may include a first battery 231 and a second battery 232 to transmit electric power to the first safety device 210 and the second safety device 220, respectively. In an embodiment, the first battery 231 and the second battery 232 may be rechargeable batteries, and the guidance device 200 may receive electric power in a wired manner via the power supply part 230 and charge the first battery 231 and the second battery 232. Afterwards, if power cannot be supplied in a wired manner when an emergency occurs, the control part 250 may supply electric power to the first safety device 210 and the second safety device 220, respectively, using the first battery 231 and the second battery 232. Since only one of the first and second safety devices 210 and 220 is actuated in the case of an emergency, the first battery 231 and the second battery 232 may be operated for the first safety device 210 and the second safety device 220, respectively, in order to increase safety.

Meanwhile, the controller 260 may basically include a communication part 261 for communicating with the repeater 270, and in some embodiments, may further include an analysis part 262 for analyzing state information for each component of the guidance device 200 that is transmitted from the control part 250.

First, the controller 260 may receive through the communication part 261 a control signal transmitted by the evacuation guidance system 112 via the repeater 270, and may transmit the received control signal to the control part 250. Such a control signal may contain information for controlling the first safety device 210 and the second safety device 220, individually, in the event of an emergency in the road tunnel 120, depending on whether the direction of evacuation from the road tunnel 120 determined by the evacuation guidance system 112 is either a first direction or a second direction opposite to the first direction. In this instance, the controller 260 may transmit the control signal to the control part 250, and the control part 250 may control the first safety device 210 and the second safety device 220, individually, in accordance with the control signal. For example, when it is required to guide evacuation in the first direction, the control part 250 may activate the first safety device 210, and when it is required to guide evacuation in the second direction, may activate the second safety device 220. As already explained, a control signal for guiding evacuation in a direction different from the direction in which evacuation is guided by the other guidance devices may be transmitted to at least one of the plurality of guidance devices 130-1 to 130-7 disposed in the road tunnel 120, depending on the locations of the plurality of the guidance devices 130-1 to 130-7 and the location of the emergency.

Moreover, the control part 250 may collect state information for each component of the guidance device 200. For example, the state information is state information of the guidance device 200, which may include information on the state of power supply, the state of the batteries 231 and 232, and/or the operating state of the power supply part 230. In this case, the controller 260 may receive such state information from the control part 250 and analyze the state information through the analysis part 262. As a more specific example, the analysis part 262 may analyze whether the guidance device 200 has a failure, based on the collected state information, and, in the event of a failure, may send information on the failure to the repeater 270 through the communication part 261, in order to convey the information on the failure to the evacuation guidance system 112. As another example, the analysis part 262 may predict at least one of the lifetime and performance of the guidance device 200 based on the collected state information, and may send a maintenance alert to the repeater 270 through the communication part 261, in order to convey the maintenance alert to the evacuation guidance system 112 based on the predicted lifetime or performance. Accordingly, the guidance device 200 is able to provide a constant support for a stable operation environment by providing predictive maintenance. In order to create such failure information or a maintenance alert, the analysis part 262 may include artificial intelligence-based firmware. In some embodiments, the analysis part 262 may simply receive state information from the control part 250 and send it to the repeater 270 through the communication part 261, in order to convey the state information to the evacuation guidance system 112. In this case, the evacuation guidance system 112 may use a machine learning engine to directly analyze the state information and create information on a failure in the guidance device 200 or a maintenance alert. Such failure information or a maintenance alert may be provided to an administrator of the evacuation guidance system 112 in various ways. For example, the evacuation guidance system 112 may transmit failure information or a maintenance alert to a terminal of the administrator.

Meanwhile, the detection sensor 240 included in the guidance device 200 may detect information on at least one of temperature, flames, and smoke. In this case, the controller 260 may receive the detected information from the detection sensor 240 and send it to the repeater 270, in order to convey the information detected by the detection sensor 240 to the evacuation guidance system 112. As already explained, the plurality of guidance devices 130-1 to 130-7 may be disposed at first preset intervals in the road tunnel 120, and the evacuation guidance system 112 is aware of information on the location of each of the plurality of guidance devices 130-1 to 130-7. Accordingly, the evacuation guidance system 112 is able to identify a more accurate location of an emergency such as fire. For example, the guidance device 200 may serve as a fire detector in the road tunnel 120.

Figure 3:
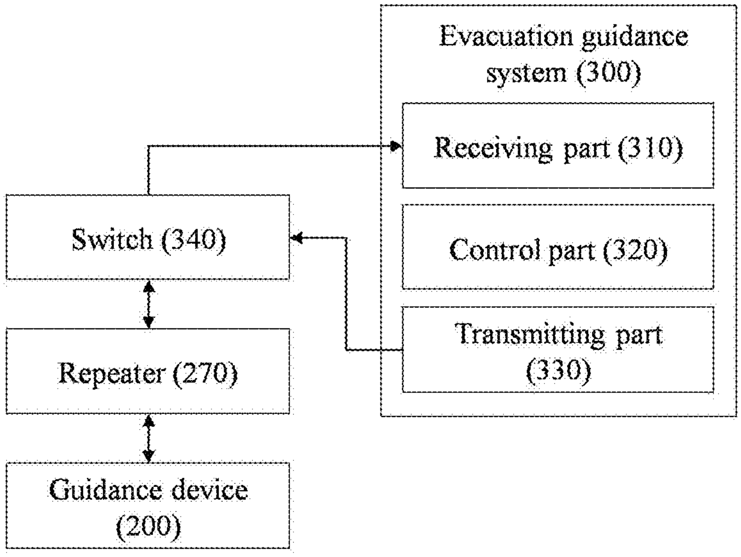
FIG. 3 is a view illustrating an example of an internal configuration of an evacuation guidance system, according to an embodiment of the present disclosure.

FIG. 3 is a view illustrating an example of an internal configuration of an evacuation guidance system, according to an embodiment of the present disclosure. The evacuation guidance system 300 according to the embodiment of FIG. 3 may include a receiving part 310, a control part 320, and a transmitting part 330.

The receiving part 310 may receive information on a jet fan disposed in the road tunnel 120 from the jet fan remote control server 111-1 which is included in the disaster control center 110, in order to remotely control the jet fan. As already explained, the receiving part 310 may receive at least some of data related to the operation of the smoke control equipment that is built in relation to the road tunnel 120 and the disaster control center 111, and the received information may include information on the jet fan.

The control part 320 may determine the direction of evacuation for each of the plurality of guidance devices 130-1 to 130-7 disposed in the road tunnel 120, based on the information on the jet fan, and may create a control signal for controlling the first safety device 210 and the second safety device 220, individually, which are respectively included in the plurality of guidance devices 130-1 to 130-7 disposed in the road tunnel 120, according to the determined direction of evacuation.

The transmitting part 330 may send the created control signal to the plurality of repeaters 140-1 and 140-2 disposed in the road tunnel 120, in order to convey it to each of the plurality of guidance devices 130-1 to 130-7. The embodiment of FIG. 3 shows an example in which a particular switch 340 and a particular repeater 270 are used to send the control signal to a particular guidance device 200.

As already explained, the first safety device 210 of the guidance device 200 may guide evacuation from the road tunnel 120 in a first direction, and the second safety device 220 may guide evacuation in a second direction opposite to the first direction. The control part 250 of the guidance device 200 may selectively activate either the first safety device 210 or the second safety device 220 in accordance with the control signal and guide the evacuee to evacuate in a particular direction which is either the first direction or the second direction.

Moreover, as explained with reference to FIG. 2, the guidance device 200 may further include a detection sensor 240 for detecting information on at least one of surrounding temperature, flames, and smoke in the road tunnel 120. In this case, the receiving part 310 may additionally receive information detected by the detection sensor 240 from the guidance device 200 via the repeater 270 and the switch 340. At this point, the control part 320 may determine the direction of evacuation by using the additionally received, detected information. In other words, the control part 320 may identify a more accurate location of an emergency such as fire, by using information detected by the detection sensor 240 of the guidance device 200, as well as the direction of smoke control by the jet fan or information from the existing sensors installed in the road tunnel 120.

In addition, as already explained, the guidance device 200 may collect state information for each component of the guidance device 200, analyze whether the guidance device 200 has a failure or not based on the collected state information, and in the event of a failure, send information on the failure to the repeater 270, in order to convey the information on the failure to the evacuation guidance system 112. In this case, the receiving part 310 may additionally receive the information on the failure via the repeater 270 and the switch 340, and the control part 320 may provide the administrator with the information on the failure through the transmitting part 330. As another example, the guidance device 200 may collect state information for each component of the guidance device 200, predict the lifetime and/or performance of the guidance device 200 based on the collected state information, and send a maintenance alert to the repeater 270, in order to convey the maintenance alert to the evacuation guidance system 112 based on the predicted lifetime and/or performance. In this case, the receiving part 310 may additionally receive information on the maintenance alert via the repeater 270 and the switch 340, and the control part 320 may provide the administrator with the maintenance alert through the transmitting part 330.

As another example, the guidance device 200 may transmit state information collected through the control device 260 to the evacuation guidance system 112. In this case, the receiving part 310 may receive such state information, and the control part 320 may analyze the state information, create information on a failure or a maintenance alert, and provide the created failure information to the administrator through the transmitting part 330.

Figure 4:
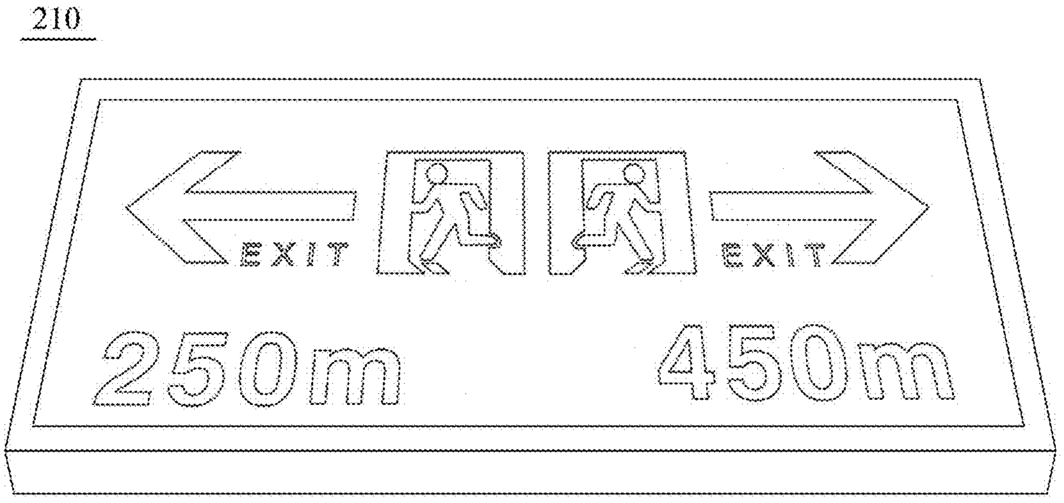
FIGS. 4 and 5 are diagrams depicting an example of implementation of a guidance device according to an embodiment of the present disclosure.
Figure 5:
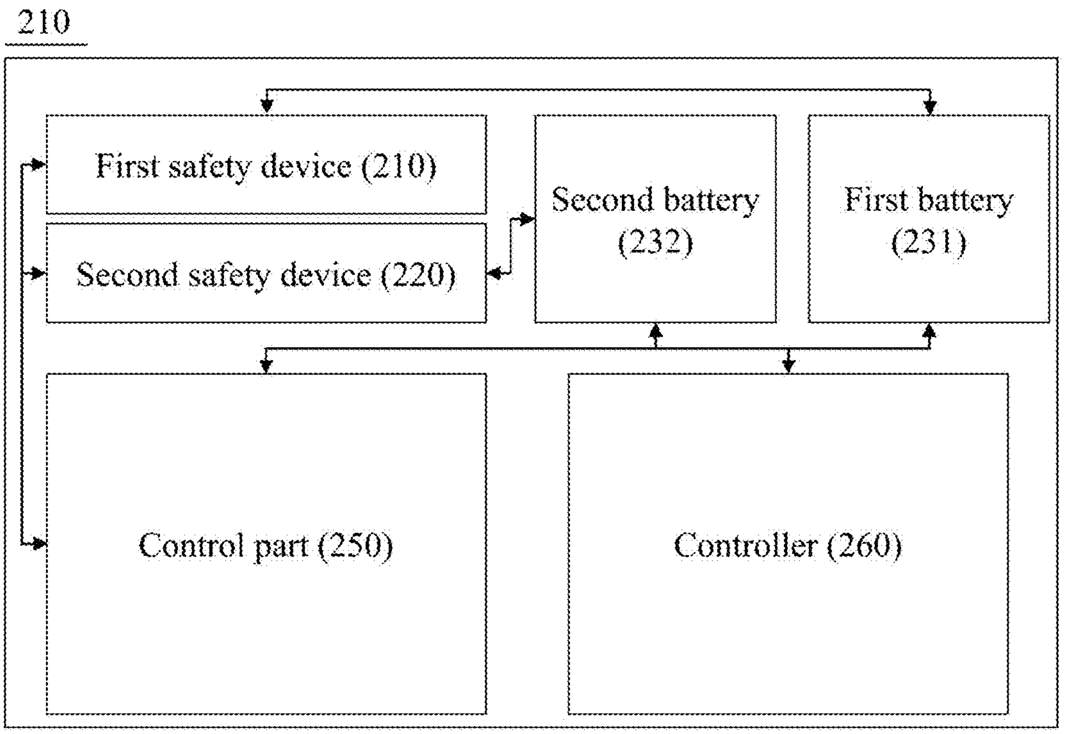

FIGS. 4 and 5 are diagrams depicting an example of implementation of a guidance device according to an embodiment of the present disclosure. FIG. 4 is a view illustrating an example of implementation of a guidance device 200 in the form of distance indicating guidance lighting. An arrow and a distance to a safe place of refugee such as an end of the tunnel, a cross passage, or a shelter may be indicated on the outside of the guidance device 200. In this case, when one of the first and second safety devices 210 and 220 shown in FIG. 5 is activated, the light at one of the arrows may be lit to provide visual evacuation information to the evacuee. Inversely, if the guidance device 200 remains constantly turned on, the guidance device 200 may keep only the light at one arrow turned on by stopping the operation of one of the first and second safety devices 210 and 220 and turning it off. As already explained, the controller 260 may receive a control signal from the evacuation guidance system 112 and transmit it to the control part 250, and the control part 250 may supply power to the first safety device 210 through the first battery 231 or to the second safety device 220 through the second battery 232 in accordance with the control signal, whereby one of the first and second safety devices 210 and 220 may be selectively activated.

Figure 6:
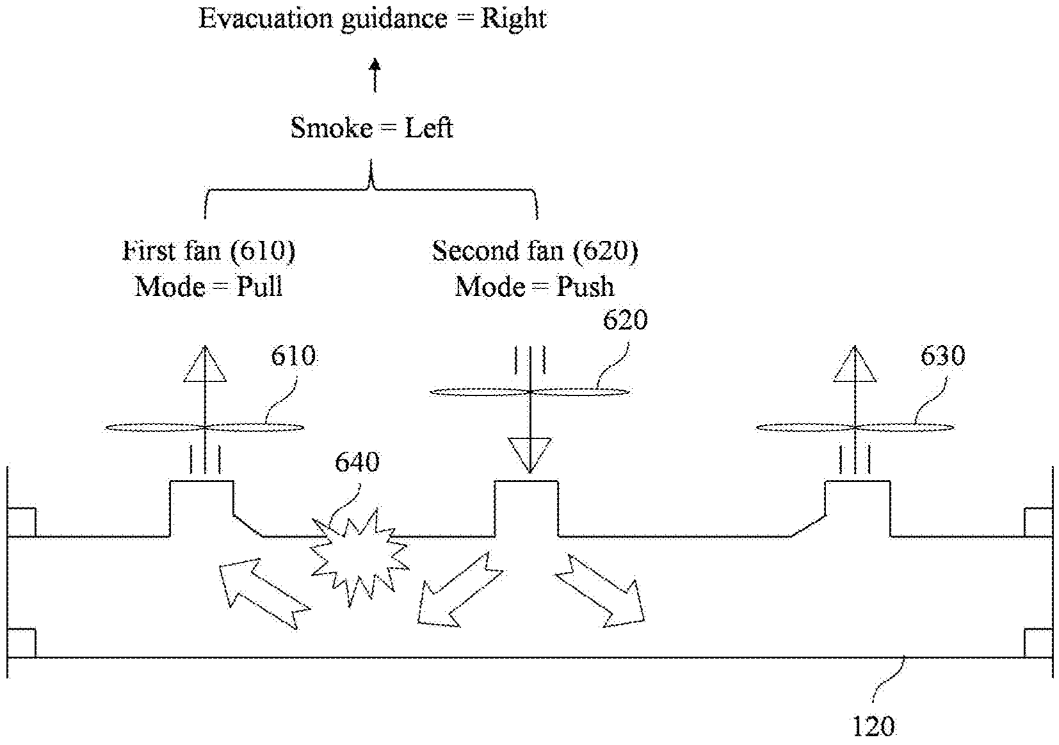
FIGS. 6 and 7 are diagrams depicting an example of a control logic of a guidance device, according to one embodiment of the present disclosure.
Figure 7:
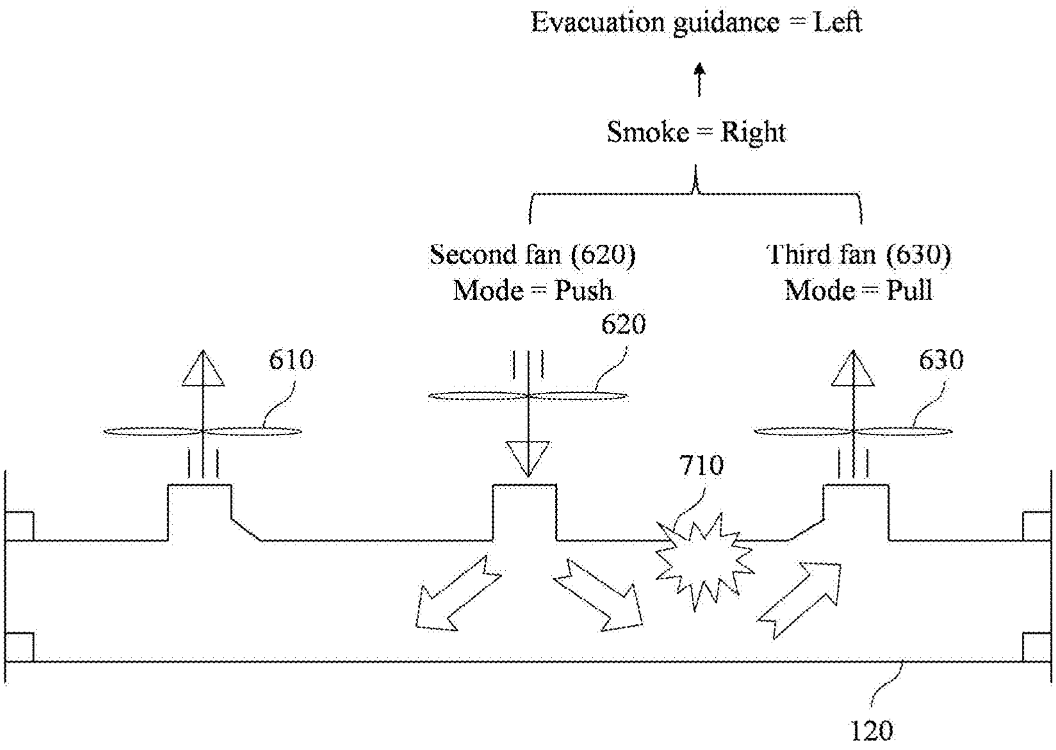

FIGS. 6 and 7 are diagrams depicting an example of a control logic of a guidance device, according to one embodiment of the present disclosure.

FIG. 6 shows an example in which a first fan 610 operates in a pull mode and a second fan 620 operates in a push mode, in relation to a fire location 640 in the road tunnel 120. In this case, the evacuation guidance system 112 may send to the guidance devices positioned at the right of the fire location 640 a control signal for guiding evacuation to the right, based on information on the fire location 640 and operation information of the first fan 610 and the second fan 620. On the other hand, the evacuation guidance system 112 may send to the guidance devices positioned at the left of the fire location 640 a control signal for guiding evacuation to the left.

FIG. 7 shows an example in which the second fan 620 operates in the push mode and a third fan 630 operates in the pull mode, in relation to a fire location 710 in the road tunnel 120. In this case, the evacuation guidance system 112 may send to the guidance devices positioned at the right of the fire location 710 a control signal for guiding evacuation to the right, based on information on the fire location 710 and operation information of the second fan 620 and the third fan 630. On the other hand, the evacuation guidance system 112 may send to the guidance devices positioned at the left of the fire location 710 a control signal for guiding evacuation to the left.

In accordance with such a control signal, the guidance devices each may turn off one of the two safety devices (e.g., the first and second safety devices 210 and 220) and guide the evacuees in the direction of evacuation.

Referring back to FIG. 1, the disaster control center server 111 of the disaster control center 110 and the evacuation guidance system 112 may interoperate in such a way that the evacuation guidance system 112 requests the disaster control center server 111 to send smoke control equipment operation information, and the disaster control center server 111 may send smoke equipment operation information to the evacuation guidance system 112 as a response. An example of message transmission for the interoperation, a Modbus TCP protocol may be used. A Modbus TCP server may be built in a system (e.g., the disaster control center 111) for automatically controlling smoke equipment, and a Modbus TCP client may be built in the evacuation guidance system 112. Using such a Modbus TCP protocol, the evacuation guidance system 112 may periodically request the disaster control center server 111 to send state information, and may use information received as a response in controlling the plurality of guidance devices 130-1 to 130-7. Table 1 below shows an example of a layout of data the evacuation guidance system 112 receives as a response from the disaster control center server 111.

| Field | Length | Description |
|---|---|---|
| In operation | 1 Byte | Type of operation (auto, manual) |
| Emergency | 1 Byte | Type of emergency (fire, normal) |
| Operating state of each fan (six fans) | N Byte | Mode of operation of each fan (push, pull, stop, failure) |

At least one of the evacuation guidance system 112 and the disaster control center server 111 may be implemented by including a computer device.

Figure 8:
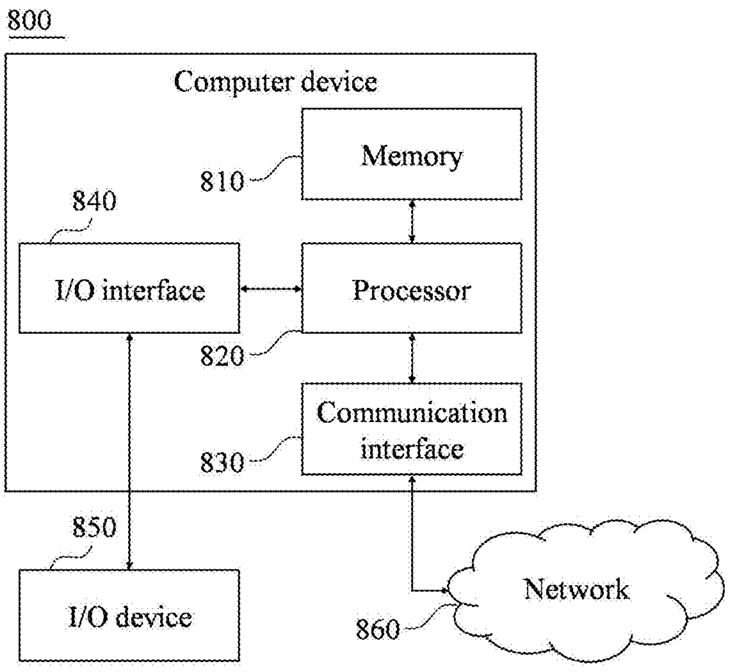
FIG. 8 is a block diagram illustrating an example of a computer device according to an embodiment of the present disclosure.

FIG. 8 is a block diagram illustrating an example of a computer device according to an embodiment of the present disclosure. As illustrated in FIG. 8, the computer device 800 may include a memory 810, a processor 820, a communication interface 830, and an input/output interface 840. The memory 810 is a computer-readable recording medium, and may include a permanent mass storage device, such as random access memory (RAM), read only memory (ROM), and a disk drive. Here, the permanent mass storage device, such as ROM and a disk drive, is a separate permanent storage device which is distinct from the memory 810, and may be included in the computer device 800. Also, an operating system and at least one program code may be stored in the memory 810. Such software components may be loaded onto the memory 810 from another computer-readable recording medium separate from the memory 810. Such a separate computer-readable recording medium may include a computer-readable recording medium such as a floppy drive, a disk, a tape, a DVD/CD-ROM drive, a memory card, etc. In other embodiments, the software components may be loaded onto the memory 810, not through a computer-readable recording medium but through the communication interface 830. For example, the software components may be loaded onto the memory 810 of the computer device 800 based on a computer program installed by files received over a network 860.

The processor 820 may be configured to process computer program instructions by performing basic arithmetic, logic, and input/output operation. The instructions may be provided to the processor 820 by the memory 810 or the communication interface 830. For example, the processor 820 may be configured to execute the instructions received according to a program code stored in a recording device such as the memory 810.

The communication interface 830 may provide a function for communication between the computer device 800 and other devices over the network 860. In an example, a request, instruction, data, file, etc. generated by the processor 820 of the computer device 800 according to program code stored in a recording device such as the memory 810 may be transmitted to other devices over the network 860 under control of the communication interface 830. Inversely, a signal, instruction, data, file, etc. from other devices may be received by the computer device 800 through the communication interface 830 of the computer device 800 over the network 860. The signal, instruction, data, etc. received through the communication interface 830 may be transmitted to the processor 820 or memory 810, and the file or the like may be stored in a storage medium (the above-mentioned permanent storage device) the computer device 800 may further include.

The input/output interface 840 may be a means for interfacing with an input/output device 850. For example, the input device may include a microphone, a keyboard, or a mouse, and the output device may include a device like a display or speaker. In another example, the input/output interface 840 may be a means for interfacing with a device like a touchscreen whose input and output functions are integrated. The input/output device 850, together with the computer device 800, may be configured as one device.

In other embodiments, the computer device 800 may include fewer or more components than the one shown in FIG. 8. However, there is no need to clearly illustrate most of the components according to the related art. For example, the computer device 800 may include at least some of the aforementioned input/output devices 850, or may further include other components, such as a transceiver, a database, etc.

In this way, according to embodiments of the present disclosure, a method and system for smart evacuation guidance in a road tunnel may be provided.

The aforementioned system or apparatus may be implemented in the form of a hardware component, a software component, or a combination of a hardware component and a software component. For example, the apparatus and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processor may perform an operating system (OS) and one or more software applications executed on the OS. Furthermore, the processor may access, store, manipulate, process and generate data in response to the execution of software. For convenience of understanding, one processor has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction or a combination of one or more of them and may configure a processor so that it operates as desired or may instruct the processor independently or collectively. The software and/or data may be embodied in a machine, component, physical device, virtual equipment or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiments may be implemented with program instructions which may be executed through various computer means, and may be recorded in computer-readable media. The computer-readable media may also include, alone or in combination, the program instructions, data files, data structures, and the like. The media may persistently store a computer-executable program or temporarily store the computer-executable program for execution or downloading. The media may be various recording means or storage means formed by a single piece of hardware or a combination of several pieces of hardware. The media are not limited to media directly connected to a certain computer system, but may be distributed over a network. Examples of the media may be those configured to store program instructions, including magnetic media such as hard disks, floppy disks, and magnetic tapes, optical media such as CD-ROMs and DVDs, and magneto-optical media such as floptical disks, ROM, RAM, and flash memory. Furthermore, other examples of the medium may include an app store in which apps are distributed, a site in which other various pieces of software are supplied or distributed, and recording media and/or store media managed in a server. Examples of the program instructions may include machine-language code, such as code written by a compiler, and high-level language code executable by a computer using an interpreter.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in a different order than described above, and/or the aforementioned elements, such as systems, structures, devices, or circuits, are combined or coupled in different forms and modes than as described above or be substituted or switched with other components or equivalents.

Therefore, other implementations, other embodiments, and equivalents to the claims are within the scope of the following claims.

The embodiments of the disclosure in which an exclusive property or privilege is claimed are defined as follows:

1. A controller included in a guidance device installed within a road tunnel, the guidance device comprising:

a power supply part;

a first safety device activated by power from the power supply part, for guiding evacuation from the road tunnel in a first direction;

a second safety device activated by power from the power supply part, for guiding evacuation in a second direction opposite to the first direction; and a control part that controls the first safety device and the second safety device, individually, in accordance with a control signal transmitted from the controller, wherein the controller comprises a communication part that communicates with a repeater disposed in the road tunnel and receives the control signal from an evacuation guidance system of a disaster control center for the road tunnel and transmits the same to the control part, wherein the control part collects state information for each component of the guidance device, and the controller further comprises an analysis part including an AI-based firmware for generating a maintenance alert to support predictive maintenance by receiving and analyzing the collected state information from the control part, wherein the analysis part predicts at least one of the lifetime and performance of the guidance device based on the collected state information, and transmits the maintenance alert to the repeater through the communication part in order to convey the maintenance alert to the evacuation guidance system based on the predicted lifetime or performance, and wherein the power supply part includes:

a first battery for supplying power to the first safety device when wired power supply to the first safety device becomes unavailable; and a second battery for supplying power to the second safety device when wired power supply to the second safety device becomes unavailable, and the first battery and the second battery are operated independently.

2. The controller of claim 1, wherein the control signal contains information for controlling the first safety device and the second safety device, individually, in the event of an emergency in the road tunnel, depending on whether the direction of evacuation from the road tunnel determined by the evacuation guidance system is either the first direction or the second direction.

3. The controller of claim 1, wherein the analysis part analyzes whether the guidance device has a failure, based on the collected state information, and, in the event of a failure, sends information on the failure to the repeater through the communication part, in order to convey the information on the failure to the evacuation guidance system.

4. The controller of claim 1, wherein the guidance device further comprises a detection sensor for detecting information on at least one of surrounding temperature, flames, and smoke in the road tunnel, and the communication part receives the detected information from the detection sensor and sends the same to the repeater, in order to convey the information detected by the detection sensor to the evacuation guidance system.

5. A guidance device installed in a road tunnel, comprising:

a power supply part;

a first safety device activated by power from the power supply part, for guiding evacuation from the road tunnel in a first direction;

a second safety device activated by power from the power supply part, for guiding evacuation in a second direction opposite to the first direction;

a control part that controls the first safety device and the second safety device, individually, in accordance with a control signal received from an evacuation guidance system of a disaster control center for the road tunnel; and a communication part that communicates with a repeater disposed in the road tunnel and receives the control signal from the evacuation guidance system and transmits the same to the control part, wherein the control part collects state information for each component of the guidance device, and the guidance device further comprises an analysis part including an AI-based firmware for generating a maintenance alert to support predictive maintenance by receiving and analyzing the collected state information from the control part, wherein the analysis part predicts at least one of the lifetime and performance of the guidance device based on the collected state information, and transmits the maintenance alert to the repeater through the communication part in order to convey the maintenance alert to the evacuation guidance system based on the predicted lifetime or performance, and wherein the power supply part includes:

a first battery for supplying power to the first safety device when wired power supply to the first safety device becomes unavailable; and a second battery for supplying power to the second safety device when wired power supply to the second safety device becomes unavailable, and the first battery and the second battery are operated independently.

6. The guidance device of claim 5, wherein the control signal contains information for controlling the first safety device and the second safety device, individually, in the event of an emergency in the road tunnel, depending on whether the direction of evacuation from the road tunnel determined by the evacuation guidance system is either the first direction or the second direction.

7. The guidance device of claim 5, wherein the analysis part analyzes whether the guidance device has a failure, based on the collected state information, and, in the event of a failure, sends information on the failure to the repeater through the communication part, in order to convey the information on the failure to the evacuation guidance system, or the analysis part predicts at least one of the lifetime and performance of the guidance device based on the collected state information, and sends a maintenance alert to the repeater through the communication part, in order to convey the maintenance alert to the evacuation guidance system based on the predicted lifetime or performance.

8. An evacuation guidance system implemented in a disaster control center for a road tunnel, the evacuation guidance system comprising:

a receiving part that receives information on a jet fan disposed in the road tunnel from a jet fan remote control server which is included in the disaster control center, in order to remotely control the jet fan;

a control part that determines the direction of evacuation for each of the plurality of guidance devices disposed in the road tunnel, based on the information on the jet fan, and creates a control signal for controlling the first safety device and the second safety device, individually, which are respectively included in the plurality of guidance devices disposed in the road tunnel, according to the determined direction of evacuation; and a transmitting part that sends the created control signal to a repeater disposed in the road tunnel, in order to convey the created control signal to each of the plurality of guidance devices, wherein the first safety device guides evacuation from the road tunnel in a first direction, and the second safety device guides evacuation in a second direction opposite to the first direction, wherein the guidance device collects state information for each component of the guidance device, and the guidance device further comprises an analysis part including an AI-based firmware for generating a maintenance alert to support predictive maintenance by receiving and analyzing the collected state information, wherein the analysis part predicts at least one of the lifetime and performance of the guidance device based on the collected state information, and transmits the maintenance alert to the repeater in order to convey the maintenance alert to the evacuation guidance system based on the predicted lifetime or performance, and wherein the receiving part further receives information on the maintenance alert, the control part provides the maintenance alert to an administrator through the transmitting part, and the guidance device further comprises a power supply part, and wherein the power supply part includes:

a first battery for supplying power to the first safety device when wired power supply to the first safety device becomes unavailable; and a second battery for supplying power to the second safety device when wired power supply to the second safety device becomes unavailable, and the first battery and the second battery are operated independently.

9. The evacuation guidance system of claim 8, wherein the guidance device further includes a detection sensor for detecting information on at least one of surrounding temperature, flames, and smoke in the road tunnel, the receiving part additionally receives the detected information from the guidance device via the repeater, and the control part determines the direction of evacuation by using the additionally received, detected information.

10. The evacuation guidance system of claim 8, wherein the guidance device analyzes whether the guidance device has a failure, based on the collected state information, and, in the event of a failure, sends information on the failure to the repeater, in order to convey the information on the failure to the evacuation guidance system, wherein the receiving part additionally receives the information on the failure, and the control part provides the administrator with the information on the failure through the transmitting part.

* * * * *